Aug. 5, 1930.  W. J. WOYWOT  1,772,061
DISPENSING VALVE
Filed Jan. 29, 1921
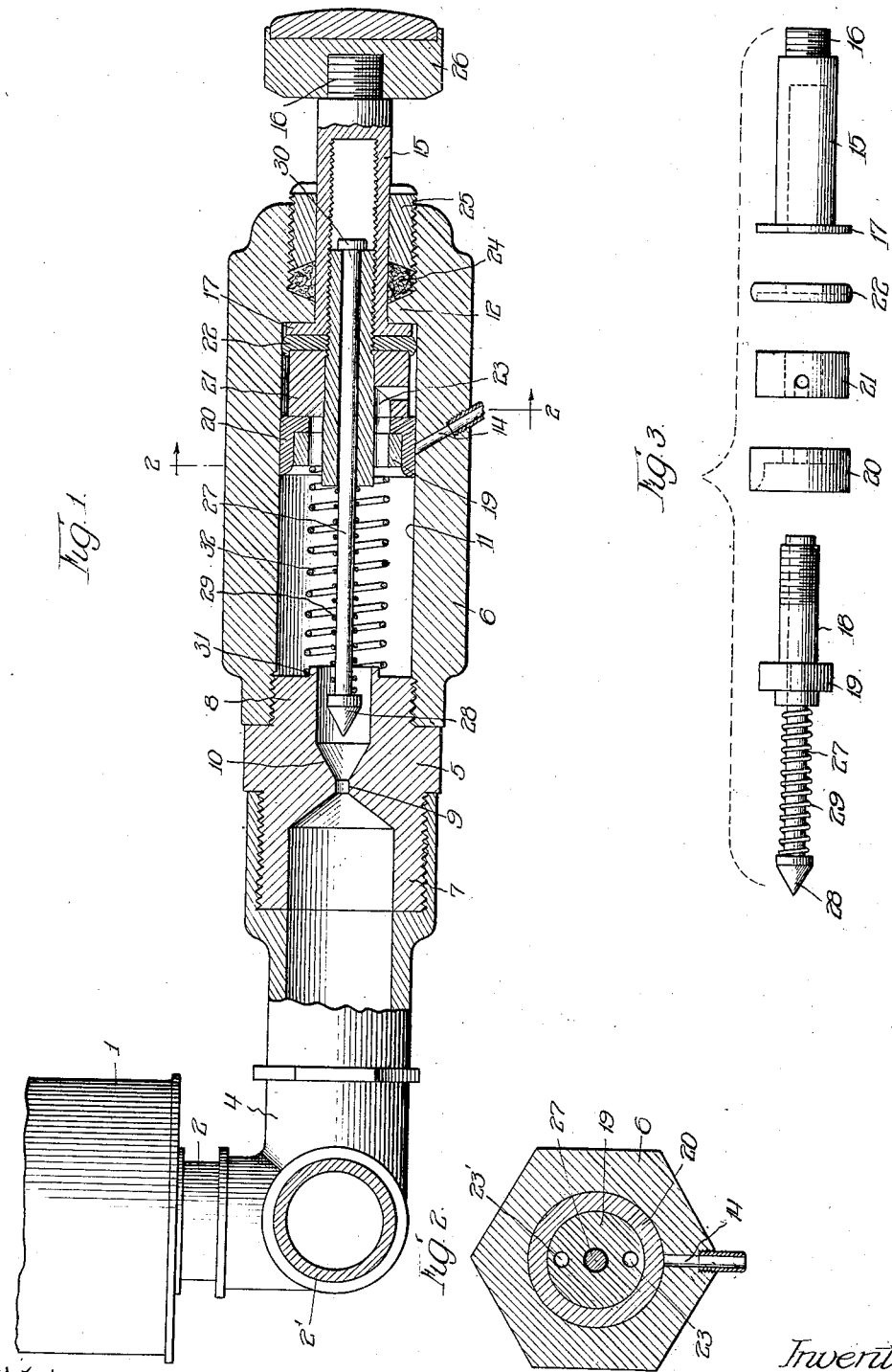
Witness:
R. Burkhardt
Inventor:
Walter J. Woywot
By Cromwell, Greist & Warden
Attorneys Patented Aug. 5, 1930

1,772,061

UNITED STATES PATENT OFFICE

WALTER J. WOYWOT, OF CHICAGO, ILLINOIS, ASSIGNOR, BY MESNE ASSIGNMENTS, TO BOBRICK CHEMICAL CORPORATION, OF LOS ANGELES, CALIFORNIA, A CORPORATION OF DELAWARE

DISPENSING VALVE

Application filed January 29, 1921. Serial No. 440,851.

This invention relates to liquid dispensing devices, and pertains particularly to improvements in measuring valves of a type designed to discharge a small measured quantity upon proper operation, and to maintain a suitable closure for the discharge between operations. The immediate use for which the invention is designed is as a dispensing device for liquid soap, suitable for use in conjunction either with an individual container for the liquid, or as an element of a dispensing system in which a pipe line is fed from a reservoir, and a plurality of dispensing valves inserted in the pipe line in association respectively with different basins. It is obvious, however, that the invention may be advantageously employed in many other situations.

It has been a universal experience in the use of mechanical devices for dispensing liquid soap that their operability is rendered uncertain by the tendency of the liquid soap to clog moving parts, its tendency to leak out through any possible avenue of escape, and the liability of the devices to rapid wear due to the fact that they are operated very frequently and with considerable violence. These unfavorable circumstances are aggravated in systems in which a plurality of dispensing devices are fed from a central tank by the fact that with devices heretofore employed it has been necessary to maintain a very considerable head of pressure on the tank and pipe line in order to insure the feed of the liquid to the devices. Not only has this increased the tendency of the liquid to leak out of any possible opening, but it has also rendered the operation of such devices somewhat difficult because of the fact that they have to be operated against such hydrostatic pressure.

The general purpose of the present invention is to provide a form of dispensing device which normally forms a tight closure for the discharge port, which may be operated easily, which is not subject to rapid wear, and which dispenses a measured charge.

More particularly stated, one object of the present invention is the provision of a dispensing device which automatically and positively charges itself by suction after each operation, thereby obviating the necessity for maintaining a considerable pressure on the supply connections.

Another particular object of the invention is the provision of a mechanism in which a measured charge is cut off from the supply quantity at each operation of the device, and ejected, without necessitating the device operating against the hydrostatic pressure in the supply line.

Another object of the invention is the provision of an apparatus in which a manually operable plunger is effective in the course of its operation to cut off a charge from the supply quantity and eject it through the outlet, then draw in a new charge and close the outlet port.

A further object of the invention is a provision of an improved construction and disposal of means for cutting off a measured charge from the supply quantity of liquid, the improved and novel construction of said means rendering it positive and certain in operation at all times and preventing its becoming incapacitated by wear.

Another purpose of the invention is the provision of a construction of dispensing valve especially adapted for the handling of liquid soap or similar gelatinous or gummy substances which are likely to form a deposit on parts of the handling mechanism, the improved features of such construction being designed to prevent the device being rendered inoperative by such deposits.

Another purpose of the invention is the provision of a structure having the capabilities above specified which may be manufactured economically, and which is certain and "fool proof" so far as its operation is concerned.

The invention has other objects which will be pointed out hereinafter, indicated in the appended claims, or will be obvious from the following disclosure in conjunction with the drawing forming a part of this specification. While the present application is predicated upon a disclosure of a single preferred embodiment of the invention, it is to be understood that the same is here presented entirely for its illustrative purpose, and is not to be regarded as imposing any limitations upon the invention as hereinafter claimed such as would operate to deny it its full and proper scope in the art.

In the drawing—

Fig. 1 is a longitudinal section of the device showing it installed in association with supply means;

Fig. 2 is a cross-section substantially on line 2—2 of Fig. 1; and

Fig. 3 is a detail illustrating the parts of the plunger in disassembled relationship.

An understanding of the invention may best be obtained by reference to the illustrative embodiment in detail. In the drawing the numeral 1 designates a suitable container for liquid soap or other material intended to be dispensed, the same acting as a supply source for a supply or distribution line 2—2′, in which a suitable T or elbow connection 4 forms a means of attachment for the dispensing device. The latter includes primarily a casing which preferably is formed in two parts, one part being the partition or valve member 5 and the other the barrel member 6 in the form of a chambered body. The partition member 5 has a nipple 7 screw threaded for connection with the connection member 4, and a boss 8 screw threaded for connection with the barrel member 6. The member 5 has a longitudinal bore adapted to communicate with the interior of the barrel 6 and with the interior of the connection member 4 and the supply line, which bore is reduced within the member 5 to form an inlet port 9 and an associated valve seat portion 10. The barrel is a tubular member having a longitudinal bore 11, most conveniently of cylindrical form arranged for co-axial alignment with the bore of the partition member 5. An annular stop member 12 extends into the bore adjacent the forward end of the barrel member and is provided with a central guiding aperture. The barrel member is provided with an outlet port 14 communicating with the bore 11.

Mounted for longitudinal sliding movement in the casing is a plunger made up of the parts illustrated in disassembled relationship in Fig. 3. These parts include a hollow stem member 15 terminating at its forward or outer extremity in a screw-threaded boss 16 and carrying at its inner extremity an annular disk 17. Mounted in this hollow stem is a sleeve member 18 having a head portion 19. Strung co-axially upon the sleeve member 18, and clamped between the head member 19 and disk 17, are an expansible washer 20, which is preferably a cup washer adapted to envelop the head member 19, a spacer member 21, and a stop or piston washer 22. The diameters of the washers are such that they will make close face contact with the wall of the bore 11, while the diameter of the spacer 21 is less, so that it will be maintained out of contact with the wall of the bore. The plunger is guided for movement in the bore by the contact between the washers and the wall thereof, and by the fit of the stem member 15 in the center opening of the stop 12. The head member 19, washer 20 and spacer 21 are apertured to provide a discharge channel 23 through which communication may be established between the discharge port 14 and the bore behind the plunger, and the head member 19 and washer 20 may be provided with auxiliary channels 23′ adapted to register with the channel in the spacer, so as to permit tightening of the washer. Packing 24 compressed between the stop member 12 and a packing nut 25 is effective to maintain a water-tight bearing about the stem 15. A suitable head or button 26 is mounted upon the boss 16. Slidably mounted in the sleeve 18 is a rod 27 carrying at its inner extremity a valve member 28 adapted for cooperation with the valve seat 10 to control the inlet port 9. A spring 29 cooperates with the sleeve 18 and the valve 28 to tend to move the rod rearwardly in the sleeve, such movement being limited by a head 30 upset on the forward end of the rod; while movement of the rod forwardly within the stem 15 is accommodated by the bore of the latter. Encompassing the valve spring 29, and centered by a boss 31 on the member 5 and the end of the sleeve 18 is a return spring 32 which is effective to move the plunger forwardly in the bore to the limit imposed by the stop 12. When the plunger is in this outer or retracted position, the outlet port 14 is closed by the washer 20, and the valve 28 is unseated from the seat 10, permitting access of fluid from the supply line to the bore 11. With the parts in this position the valve 28 is housed within the larger portion of the bore of the partition member 5 which functions as a centering guide in the assembling of the device and, together with the conical form of the valve and the valve seat, is effective to insure accurate seating of the valve. Upon inward movement of the plunger, which may be effected by pressure exerted against the button 26, the valve 28 is advanced to the point where it will close the port 9, thus cutting off the liquid within the bore 11 from that in the supply line. Approximately at the time the port 9 is thus closed, communication between the discharge channel 23 and the outlet port 14 is established, so that continued forward movement of the plunger will be effective to eject the liquid from the bore 11 through the discharge channel 23 and the discharge port 14. Such further inward movement of the plunger after the valve 28 has seated is accommodated by the forward movement of the rod 27 in the stem 15. Upon release of pressure from the button 26, the plunger will be quickly restored, first under the combined influence of springs 27 and 32, and finally under the influence of spring 32 alone. In the course of such outward or restoring movement of the plunger, it is obvious that valve 28 will be removed from its seat 10 before the outward movement of the plunger is completed, thus re-establishing communication between the bore of the barrel and the supply conduit. Due to the cooperation of the piston washer 22 with the wall of the bore, this outward movement of the plunger will be effective to draw a charge of liquid through the inlet port 9 into the bore 11, where it remains until the next inward movement of the plunger, by which it is ejected as above described.

Certain detail features of the construction are of importance in securing this operation. One of such features is the use of the expansible washer 20 which being of cup form, maintains an intimate but flexible cooperation with the wall of the bore, thus preventing the leakage of liquid about it, due to the tendency of the pressure of the liquid in the bore to expand the washer, and also preventing the jamming of the plunger by a deposit of viscous material on the wall of the chamber at the margin of the washer. The form of the washer tends to prevent such a deposit moreover, as such deposits form most readily in re-entrant crevices, none of which are formed by the cooperation of the washer with the wall of the bore. Another important detail resides in the fact that there are liberal clearances between all relatively movable metal parts, such as the periphery of the spacer 21 and the bore, thus preventing the clogging of the plunger by small deposits between such surfaces. The washer 22 prevents leakage of liquid in front of the spacer 21. and wipes the surface of the bore upon each operation of the plunger. The seating of the valve 28 upon the seat 10 relieves the plunger from the hydrostatic pressure of the liquid in the supply line and the reservoir, so that its inward movement may be effected without having to lift the column of liquid. The cooperation of the valve 28 and seat 10 provides a stationary closure of substantial area, thus eliminating wear on the valve and the valve seat.

It will be obvious from the foregoing that a device constructed and operating in the manner above described is of particular utility in the dispensing of measured quantities of viscous liquid, that it normally maintains a tight closure for the outlet, that. due to the fact that it charges itself on the return stroke, charges will always be ejected on successive operations, no matter how quickly they may follow each other, and that it may be readily dismounted and disassembled for the purpose of cleaning or repair.

I claim:

1. A dispensing device comprising a chambered body provided with an inlet and an outlet port, a piston in said body movable relatively to both of said ports and adapted to normally close one of them, said piston having two longitudinal channels extending inward from the face of the piston, a valve member carried slidably in one of said channels and adapted to close the other of said ports, the other channel forming unrestricted communication between the chambered body and outlet port on inward movement of said piston.

2. A dispensing device comprising a chambered body provided with an inlet and an outlet port, a piston in said body movable relatively to both of said ports, said piston having an enlarged head having sliding contact with said chambered body across the outlet port to maintain said port sealed during a predetermined inward movement of said piston, a valve member telescopically carried by the piston and adapted to close the inlet port, a channel in said piston for slidably supporting the valve member, an independent unrestricted channel through said piston affording communication between the inlet port and outlet port when said piston is moved to uncover said outlet port, yielding pressure means for urging the piston to the outlet port closing position, and separate yielding pressure means for urging the valve towards the inlet port.

3. A dispensing device comprising a chambered body provided with an inlet and an outlet port, a piston in said body movable relative to both of said ports and adapted to maintain said outlet port closed during a predetermined inward movement thereof, and a valve operable by said piston for closing said inlet port, said piston having an unrestricted outlet channel opening in the face of said piston adapted to afford free communication between the chambered body and said outlet port upon movement of said piston to close said inlet port.

4. In a liquid dispensing device the combination of a body having a uniform axial bore and inlet and outlet ports communicating with said bore, a plunger movable within said bore between said ports, a valve operable by said plunger for closing said inlet port, a liquid dispensing piston carried by said plunger having sliding contact with the wall of said bore across said outlet port to maintain said outlet port closed during movement of the plunger to close said inlet port.

5. In a liquid dispensing device, the combination of a body having a uniform axial bore and inlet and outlet ports communicating with said bore, a plunger movable within the bore of the body between said ports, a circumferentially expansible washer carried by said plunger having sliding contact with the wall of said bore across said outlet port to provide a piston, and also a valve for said outlet port.

6. In a liquid dispensing device the combination of a chambered body having a uniform axial bore and inlet and outlet ports communicating with said bore, a plunger movable within said bore between said ports, a liquid dispensing piston carried by said plunger having sliding contact with the wall of said bore across said outlet port to maintain said outlet port closed during a predetermined outward movement of said piston, said piston being reduced between its ends to provide an annular space adjacent the chamber wall adapted to communicate with the outlet port during a predetermined inlet movement of the piston, there being a channel through the piston head forming communication between the chambered body and the annular space around the piston.

In testimony whereof I have hereunto signed my name.

WALTER J. WOYWOT.